United States Patent [19]
Killgore et al.

[11] Patent Number: 5,642,660
[45] Date of Patent: Jul. 1, 1997

[54] GAS FIRED DEEP FAT FRYER

[76] Inventors: Robert R. Killgore, Rt. 3, Box 1255;
Kelly G. Goodwin, 313 Spring St.,
both of Haynesville, La. 71038-9803

[21] Appl. No.: 605,616

[22] Filed: Feb. 22, 1996

[51] Int. Cl.⁶ .......................... A47J 27/00; A47J 37/12
[52] U.S. Cl. .......................... 99/403; 99/418; 126/391
[58] Field of Search ........................ 99/403, 407, 418; 126/391

[56] References Cited

U.S. PATENT DOCUMENTS

| | | | |
|---|---|---|---|
| 2,465,953 | 3/1949 | Wollner | 126/391 |
| 2,491,000 | 12/1949 | Cone | 126/391 |
| 2,617,407 | 11/1952 | Johnson | 126/391 |
| 2,655,144 | 10/1953 | Keating | 126/391 |
| 3,714,889 | 2/1973 | Mazzola | 99/403 X |
| 3,722,498 | 3/1973 | Kimbrough | 126/38 |
| 3,990,433 | 11/1976 | Keating | 126/391 |
| 4,397,299 | 8/1983 | Taylor et al. | 126/391 |
| 4,751,915 | 6/1988 | Price | 126/391 |
| 4,913,041 | 4/1990 | Taber et al. | 99/403 |
| 5,230,280 | 7/1993 | Anderson et al. | 126/391 X |
| 5,386,815 | 2/1995 | Ejiri et al. | 99/403 X |
| 5,402,713 | 4/1995 | King | 99/408 |
| 5,417,202 | 5/1995 | Cote | 126/391 |

*Primary Examiner*—Reginald Alexander
*Attorney, Agent, or Firm*—John M. Harrison

[57] ABSTRACT

A gas fired deep fat fryer, typically provided with legs equipped with optional wheels and including a tank for containing a cooking medium and fitted with a drain line and valve for draining the cooking medium from the tank. A single burner tube projects through the tank wall from a vented tube stub which receives an orifice nipple that introduces gas into the burner tube. The burner tube defines a U-shaped heating loop in the tank and terminates at the opposite end from the tube stub in an upward-standing stack that extends through the tank wall. Heat is applied to the burner tube from the orifice nipple and is dissipated through the U-shaped heater loop directly to the cooking medium. A grate is placed over the U-shaped heating loop in the tank to prevent food in the tank from directly engaging the burner and sinking to the bottom of the tank. A removable or hinged lid may be provided on the tank and the stack is preferably slotted to facilitate sufficient draw of flame from the orifice nipple through the U-shaped heating loop in the tank to efficiently heat the cooking medium. A support tray may be provided on the tank for supporting and organizing such items as cooking implements, dishes, seasoning and accessories.

13 Claims, 2 Drawing Sheets

GAS FIRED DEEP FAT FRYER

BACKGROUND OF THE INVENTION

1. Field of the Invention

This invention relates to cooking devices, including deep fat cookers or fryers and more particularly, to a gas fired deep fat fryer which is characterized by a tank for containing a cooking medium such as cooking oil or grease, a burner tube extending through the tank wall from a vented tube stub which receives an adjustable orifice nipple that supplies gas to the burner tube, a U-shaped heating loop element of the burner tube located in the tank for directly contacting and heating the cooking medium and a vented stack extending through the tank wall and terminating the heating loop of the burner tube for venting flue gas from the burner tube. Fixed or removable legs are provided on the tank and wheels may be provided on at least one set of legs for enhancing mobility of the gas fired deep fat fryer. A removable or hinged lid may be provided on the tank and an accessory support tray may also be extended from one end of the tank for supporting and organizing such items as cooking implements, dishes, seasoning and accessory items, as desired. In a preferred embodiment, parallel sides of the tank are bevelled at the bottom and the tank includes a drain line and valve in one end for draining the cooking oil or grease from the tank.

One of the problems realized in designing deep fat fryers and particularly, gas fired deep fat fryers, is that of efficiently transmitting heat from a gas fired burner system to the cooking medium, such as oil or grease, placed in a container, which container is normally placed on a frame or platform above the open fire. Conventional burners designed in this manner operate very inefficiently and are highly sensitive to wind and air currents, which can greatly reduce an already inefficient conductive heat transfer from the container positioned above the burner to the cooking medium. Compensation for the inefficiency in indirectly heating the cooking medium by this technique is usually effected by increasing the gas pressure and, therefore, the flame spread and the heat applied to the container, an effort which usually results in even greater difficulty in maintaining the cooking medium at a desired optimum temperature for cooking food in the container.

It has surprisingly been found that a single continuous burner tube having a U-shaped heating loop or element located in a cooking tank or vat in direct contact with the cooking medium, with the heating loop or element fired at one end with a stoichiometric mixture of gas and air and a vented stack extending from the opposite end of the heating loop or element, provides a highly efficient heating system for the cooker.

2. Description of the Prior Art

Various types of gas fired cooking devices are known in the art. Typical of these is the Portable Deep Fryer Assembly detailed in U.S. Pat. No. 3,722,498, dated Mar. 27, 1973, to Clyde H. Kimbrough. The device includes a vertically-extended tube, a heat plate mounted at the top of the tube to contain cooking oil or shortening and designed to accommodate a basket for containing the food to be cooked. The legs are detachably connected to the heat plate and the chimney is connected to the extending tube. An opening is provided in the flame chute portion of the tube and a jet burner is detachably supported and depends from the lower end of the tube by rod members having elongated ends. A source of compressed gas or utility gas is attached to the jet burner to supply fuel to the assembly. U.S. Pat. No. 3,990,433, dated Nov. 9, 1976, to Richard T. Keating, details a "Gas Burner Flame Temperature Amplifier". The device is designed to increase the combustion flame temperature of a partially-aerated atmospheric gas burner heater and the heat transfer from the heater by injection of jets of preheated secondary air into the combusting chamber to help move the flow of burning gases therethrough. A "Deep Fat Fryer" is detailed in U.S. Pat. No. 4,397,299, dated Aug. 9, 1983, to Cecil K. Taylor, et al. The deep fat fryer includes a tank of inverted U-shaped configuration formed in either a single compartment or divided into two compartments by a medial divider shaped from two parallel, spaced panels with an insulated space between the panels. A pair of infrared-type gas burners are positioned adjacent to inner walls of the lower side portions of the tank and receive a measured amount of pressurized combustion air, which is mixed with fuel gas to heat radiant tile elements of the burner and radiate heat against the tank wall, with the combustion air being substantially no more than the minimum amount necessary to complete combustion. U.S. Pat. No. 4,751,915, dated Jun. 21, 1988, details a "Gas Fired Fryer and Gas Fired Burner Useful Therefor". In the device, a conduit extends through a fry pot so as to be immersed in a frying oil. Combustion occurs in an inlet portion of the conduit and products of combustion are exhausted through an outlet portion of the conduit through serpentine channels along certain walls of the fry pot. Insulating panels form outer walls of the channels and a burner designed to create a vortex of air is provided with a minor portion of the gas ignited before a valve controlling a major portion of the gas is open. U.S. Pat. No. 4,913,041, dated Apr. 3, 1990, to Bruce E. Taber, et al, details a "Deep Fat Frying Apparatus". The fryer has an upper heating section with a bottom wall, from which a spaced pair of well sections depend. An electric shortening melter is provided in the fry pot and a solid insulating material panel structure envelops and abuts portions of the well section and defines a heating cavity which receives a dual gas fired burner assembly. Interior surface portions of the panel structure are recessed to define a multi-fast heating flow passage system which extends along and is partially bounded by laterally outwardly-facing, exterior surface portions of the wells. A specially designed mixture supply system is provided to flow a gas-air mixture into each of the gas fired burners for combustion. U.S. Pat. No. 5,402,713, dated Apr. 4, 1995, to James D. King, details a "Gas Fired Deep Fat Fryer" that employs an interior array of heat exchanger tubes arranged in a U-shaped configuration along the sides and back of a vat. The heat exchanger tubes are located in the interior of the vat with the ends attached to the front vat wall. Each heat exchanger tube employs one or more premix burner components which direct combusting fuel and oxygen into the heat exchanger tube from one end. Each heat exchanger tube may have its burners on either end of the tube and the combustion gases produced by the burners travel through the heat exchanger tubes and exit into a combustion channel. The combustion channel directs the gases exiting the heat exchanger tube around and in contact with at least a portion of the exterior wall of the vat and then to an exhaust flue at the rear of the vat. U.S. Pat. No. 5,417,202, dated May 23, 1995, to Joseph A. C. Cote, details a "Gas Fryer Heat Exchanger" which includes multiple heat transfer tubes, each having an inlet end and an outlet end and at least one of the heat transfer tubes extending at a first selected angle. Other heat transfer tubes extend at a second selected angle opposite to the first selected angle and some tubes extend horizontally. At least one mixing plenum having multiple inlet openings and multiple outlet openings, is provided and the heat transfer tubes are sealed in the plenum.

It is an object of this invention to provide a new and improved, single burner tube, gas fired deep fat fryer which effects direct contact between the cooking medium and the burner tube and is thus designed to increase the efficiency of heat transfer between the burner tube and the cooking medium located in a tank or pot which accommodates the primary heat-producing element of the burner tube.

Another object of this invention is to provide a gas fired deep fat fryer which includes a tank, through which is extended a U-shaped heating loop element of a gas fired burner tube of selected length, for directly contacting and heating cooking oil, grease or other cooking medium in the tank.

Still another object of this invention is to provide a new and improved gas fired deep fat fryer which is simple in design and yet operates in a highly efficient manner to transfer heat from a U-shaped heating loop element in a one-piece, relatively short burner tube, to the cooking oil, grease or other cooking medium in a tank, thus optimizing heat transfer directly from the U-shaped heating loop to the cooking medium responsive to the burning of gas at an orifice nipple adjustably positioned in one end of the burner tube and release of burned products of combustion from a vented stack extending from the opposite end of the burner tube.

Still another object of this invention is to provide a gas fired deep fat fryer which includes a tank of selected volume having a tapered bottom and a drain line and valve for removing the cooking medium, which tank is fitted with a U-shaped heating loop forming a segment of a burner tube system, one end of which U-shaped heating loop extends to a burner tube provided with a slidably adjustable gas orifice nipple and the opposite end of which heating loop is vented and extends upwardly as a stack to dispense flue gas. The continuous burner tube is so designed that burning gas at the orifice nipple in the tube stub end of the burner tube extends substantially through the U-shaped heating loop of the burner tube and is exhausted through the stack, to directly heat cooking oil, grease or other cooking medium in the tank and maintain the cooking medium at a selected, substantially constant temperature during the cooking process.

SUMMARY OF THE INVENTION

These and other objects of the invention are provided in a new and improved gas fired deep fat fryer which is characterized in a preferred embodiment by a rectangular, bottom-bevelled tank mounted on fixed or removable legs and fitted internally with a burner tube having a U-shaped heating loop element. One end of the burner tube defines a vented tube stub that linearly adjustably and removably accommodates a gas orifice nipple for introducing burning, low pressure bottled or utility gas through the burner system and the opposite end of the burner tube terminates in an upward-standing, vented stack extending from the U-shaped heating loop, to exhaust the burned products of combustion. Cooking oil, grease or other cooking medium is placed in the tank for direct heating by the U-shaped heating loop element of the burner tube to a desired temperature and maintenance of the desired temperature throughout the cooking process. A lid may be removably or hingedly attached to the tank for covering the tank and a removable grid may be provided in the tank on the U-shaped heating loop for separating the food being cooked from the U-shaped heating loop.

BRIEF DESCRIPTION OF THE DRAWING

The invention will be better understood by reference to the accompanying drawings, wherein.

DESCRIPTION OF THE PREFERRED EMBODIMENTS

Figures 1, 2, 3:
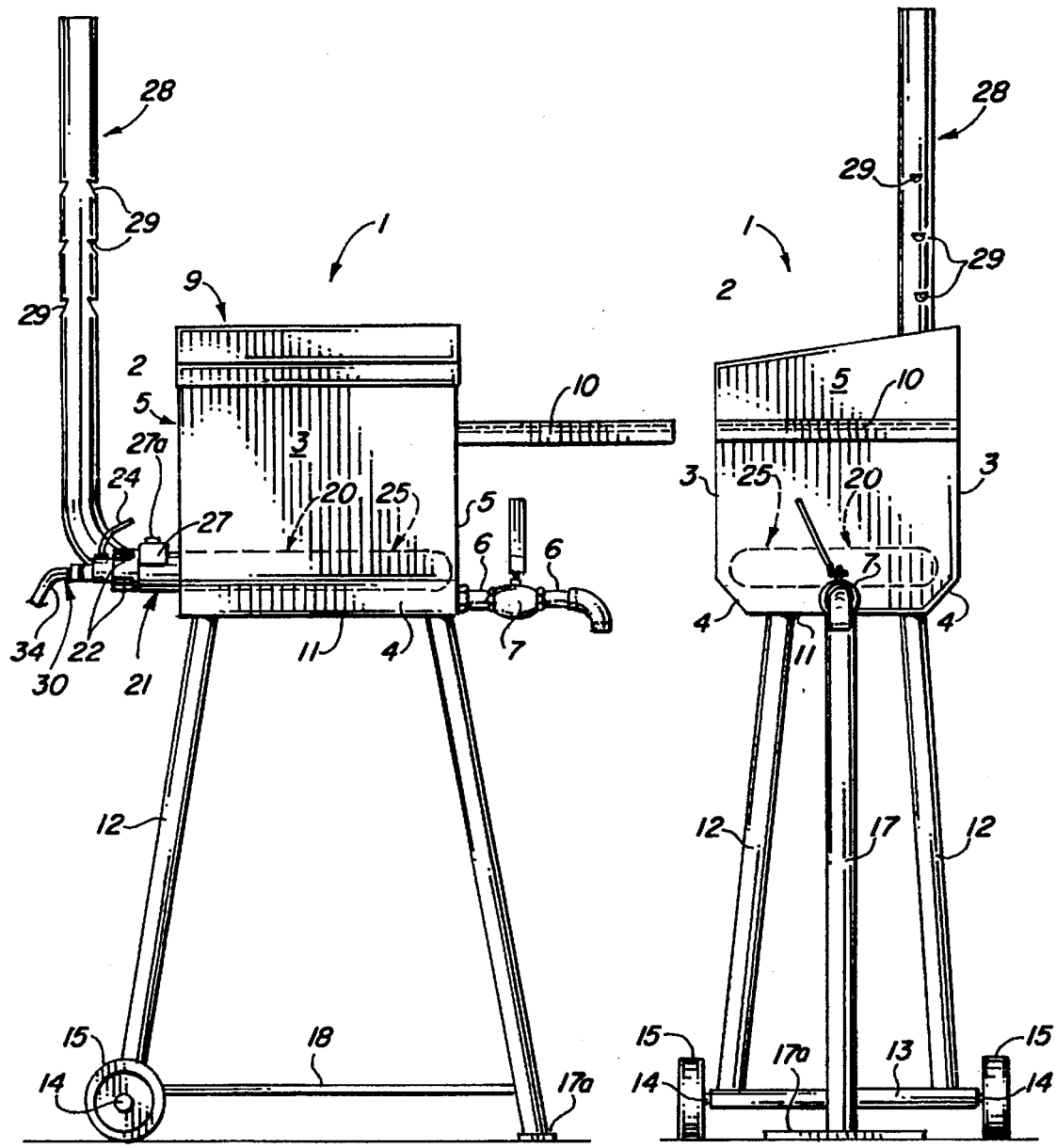
FIG. 1 is a left side view of a preferred embodiment of the gas fired deep fat fryer of this invention.
FIG. 2 is a front view of the gas fired deep fat fryer illustrated in FIG. 1 with the lid removed from the fryer tank.
FIG. 3 is a top view of the gas fired deep fat fryer illustrated in FIG. 2 with the drain line and valve removed.
Figure 4:
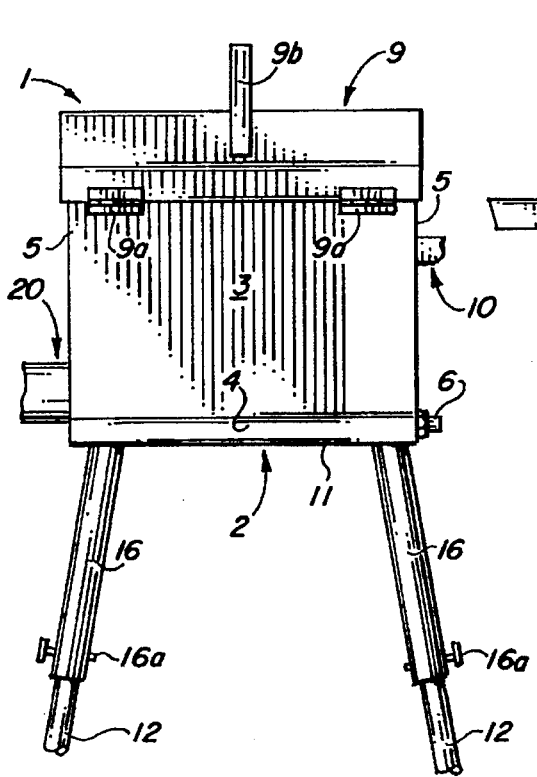
FIG. 4 is a left side view of the gas fired deep fat fryer with a hinged lid.
Figure 5:
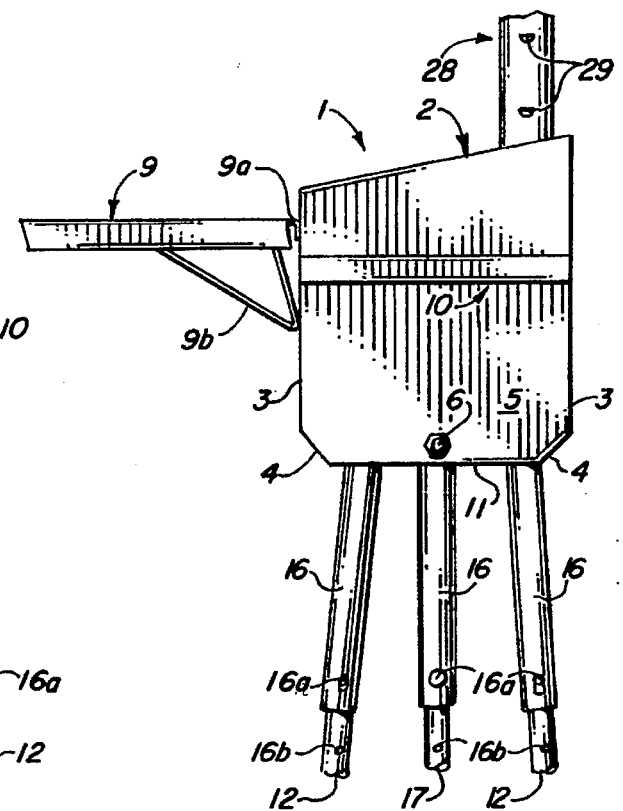
FIG. 5 is a front view of the gas fired deep fat fryer fitted with a hinged lid.
Figure 6:
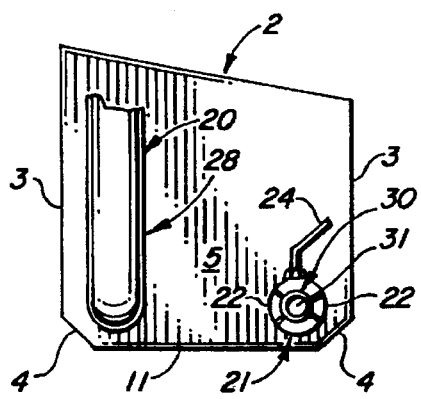
FIG. 6 is an enlarged rear view of the tank, tube stub and stack elements of the deep fat fryer.

Referring initially to FIGS. 1 and 2 of the drawings, the gas fired deep fat fryer of this invention is generally illustrated by reference numeral 1. The gas fired deep fat fryer 1 includes a rectangular tank 2, defined by parallel tank sides 3, that taper in oppositely-disposed relationship with respect to each other at the bottom thereof, to define a pair of side bevels 4, terminating at a tank bottom 11. The tank sides 3 are closed by a pair of parallel tank ends 5. A tank drain line 6 communicates with the inside of the tank 2 and extends through one of the tank ends 5 for draining cooking medium (not illustrated) from the interior of the tank 2 and a drain line valve 7 is provided in the tank drain line 6 for regulating the flow of cooking medium from the tank 2. An expanded metal support tray 10 extends from the tank 2 for supporting cooking implements, dishes, seasoning and accessories, such as a food frying basket, frying tongs and the like (not illustrated). A pair of dual legs 12 extend downwardly from fixed attachment to the tank bottom 11 of the tank 2 as illustrated in FIG. 2, or from leg stubs 16, as illustrated in FIGS. 4 and 5 and the dual legs 12 cooperate with a single leg 17, which projects from the opposite side of the tank bottom 11 to a leg plate 17a, as further illustrated in FIG. 2, or from a leg stub 16, as further illustrated in FIGS. 4 and 5, to support the tank 2 at a desired elevation. In a preferred embodiment of the invention an axle mount 13 connects the dual legs 12 at the bottom ends thereof and an axle 14 is mounted on the axle mount 13 to receive a pair of wheels 15, as further illustrated in FIGS. 1 and 2. A leg brace 18 may be extended and fixed between the axle mount 13 and the single leg 17 for bracing purposes. Under circumstances where the dual legs 12 and the single leg 17 are mounted on the leg stubs 16, welded or otherwise attached to the tank bottom 11 of the tank 2 as illustrated in FIGS. 4 and 5, leg pins 16a are extended transversely through openings (not illustrated) in the leg stubs 16 and registering pin openings 16b in the dual legs 12 and single leg 17, for removably attaching the dual legs 12 and the single legs 17 to the leg stubs 16, respectively.

Figure 7:
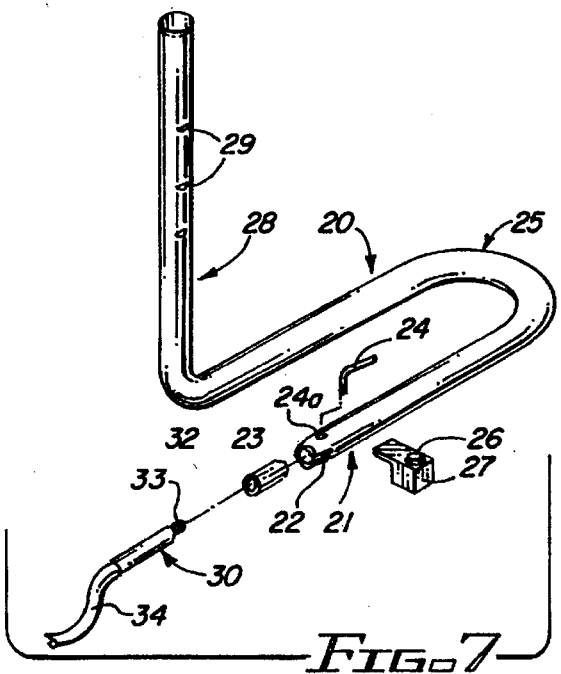
FIG. 7 is a perspective, partially exploded view of the burner tube, orifice nipple and gas igniter elements of the gas fired deep fat fryer.

As further illustrated in FIGS. 1–3, 6 and 7, a single, shaped burner tube 20 originates at a tube stub 21, positioned outside of the tank 2 and extends through one of the tank ends 5, where it is welded in place to define a U-shaped heating loop 25, that projects again through the same one of the tank sides 3, where it is also welded in place, and curves upwardly to define a stack 28. A loop bracket 26 is preferably welded or otherwise attached to the opposite tank end 5 of the tank 2 and is also welded to the heating loop 25, to stabilize the heating loop 25 inside the tank 2, as illustrated in FIG. 3. The tube stub 21 is fitted with stub vents or openings 22 for receiving air to support combustion of gas inside the tube stub 28, as hereinafter described, and a stub bore 23 extends longitudinally through the tube stub 21 for adjustably receiving an orifice nipple 30, as illustrated in FIG. 7. An orifice nipple clamp 24 is transversely threaded in a threaded opening 24a in the tube stub 21 to facilitate selectively clamping the orifice nipple 30 and nipple sleeve 32 in position in the stub bore 23 of the tube stub 21, for purposes which are hereinafter further described. The orifice nipple 30 is connected to a tank (not illustrated) containing low pressure bottled gas such as butane, propane or other low pressure gas, or to a source of natural gas such as household or utility gas service (not illustrated) by means of a flexible hose 34. The orifice nipple 30 is fitted with a conventional gas injector 33 which threads on the orifice nipple 30 and the gas injector 33 includes an orifice (not illustrated) which communicates with the nipple bore 31 of the orifice nipple 30 and is sized to accommodate either low pressure or utility gas introduced into the orifice nipple 30 from the fuel tank or the utility gas supply, according to the knowledge of those skilled in the art. A gas ignitor 27 may also be provided on the tube stub 21 if desired, and includes an ignitor button 27a, which is connected to ignitor wiring (not illustrated) that extends into the tube stub 21 at the orifice nipple 30, to generate a spark inside the tube stub 21 and downstream of the orifice nipple 30 and ignite the gas flowing through the nipple bore 31 and gas injector 33 of the orifice nipple 30. Alternatively, the orifice nipple 30 can be removed from the tube stub 21 of the burner tube 20 by loosening the orifice nipple clamp 24 and the gas emitted from the orifice in the gas injector 33 can be ignited directly by a match or a gas-fired lighter. The orifice nipple 30 is then re-extended into the tube stub 21, where it is clamped in place while burning, using the orifice nipple clamp 24, to begin the cooking medium heating process.

Referring again to FIGS. 1 and 2 of the drawings, in a preferred embodiment of the invention several stack vents 29 are provided in the stack 28 to enhance the air "draw" or flow in the stack 28 and extend the flame projecting from the orifice opening in the gas injector 33 through the tube stub 21 and substantially around the expanse of the heating loop 25 inside the tank 2, thus optimizing heat transfer between the heating loop 25 and a supply of cooking oil, grease or other cooking medium provided in the tank 2 and covering the heating loop 25. In a preferred embodiment of the invention a removable expanded metal tank grate 8 is seated on the heating loop 25 inside the tank 2 to prevent cooked and cooking food from sinking in the tank 2 to the level of the heating loop 25 at or near the tank bottom 11 of the tank 2.

In another preferred embodiment of the invention a tank lid 9, preferably fitted with a handle 9b, may be placed over the top of the tank 2 to cover the contents of the tank 2, as illustrated in FIGS. 1, 4 and 5. In a most preferred embodiment of the invention the tank lid 9 is fitted with a lid hinge 9a, also attached to the tank 2, and the handle 9b serves as a lid support, being located on the tank 2 adjacent to the lid hinge 9a. Accordingly, opening of the tank lid 9 on the lid hinge 9a causes the handle 9b to engage the tank side 3 of the tank 2 and not only facilitates access to the tank 2, but also use of the open, horizontal tank lid 9 as an accessory tray or support, as illustrated in FIGS. 4 and 5.

It will be appreciated by those skilled in the art that the gas fired deep fat fryer 1 of this invention can be constructed with a tank 2 of any desired size, depending upon the personal and commercial needs of the user. It has surprisingly been found that no matter what the size of the tank 2 or the gas fired deep fat fryer 1, the single burner tube 20, having a heating element defined by the heating loop 25, is sufficient to adequately heat cooking oil, grease or other cooking medium provided in the tank 2 to a desired temperature and maintain that temperature without constantly having to adjust the flow of gas from the fuel tank or alternative utility gas source into the orifice nipple 30 and through the orifice in the gas injector 33. An optimum, stoichiometric (blue flame) mixture of gas and air can be effected in the tube stub 21 regardless of wind conditions, by linearly adjusting the orifice nipple 30 in the tube stub 21 after the gas is ignited, and subsequently clamping the orifice nipple 30 in place using the orifice nipple clamp 24, as illustrated in FIG. 3. Furthermore, at least the heating loop 25 of the burner tube 20 may be constructed of stainless steel or other metal or material which will withstand high temperatures and in a preferred embodiment, the entire burner tube 20, including the tube stub 21, heating loop 25 and stack 28, is fashioned from one length of stainless steel pipe, such as Number 308 stainless steel, in non-exclusive particular. Alternatively, the heating loop 25 can be flanged, welded or otherwise connected to the tube stub 21 and stack 28, respectively, to define the burner tube 20. Moreover, under circumstances where the tank lid 9 is attached to the tank 2 by means of the lid hinge 9a, the tank lid 9 becomes a support for additional accessories after having been being pivoted 180 degrees on the lid hinge 9a from a configuration where it covers the tank 2 into the auxiliary position using the handle 9b, as a brace, as heretofore described and as illustrated in FIG. 5. Under circumstances where the oil, grease or alternative cooking medium in the tank 2 has cooled and needs to be removed from the tank 2, the drain line valve 7 in the tank drain line 6 may be opened and the cooking medium drained from the tank 2 into a collection vessel (not illustrated). The inside of the tank 2 may be then wiped clean with a rag or paper towel and the gas fired deep fat fryer 1 is ready for additional use.

Referring again to the side bevels 4 in the tank sides 3 of the tank 2, it will be appreciated by those skilled in the art that this facility reduces the quantity of cooking medium necessary for cooking in the tank 2 and thus serves to conserve cooking medium, reduce heat-up time and concentrate cooking residue such as corn meal and the like, which accumulates in the cooking medium, on the tank bottom 11 between the oppositely-disposed side bevels 4, to better facilitate draining and cleaning the tank 2. It will be further appreciated that the tank grate 8 is removable, and when positioned in functional configuration, normally rests on the U-shaped heating loop 25 segment of the burner tube 20 to prevent the food being cooked from settling to the tank bottom 11 and locating between the feeding loop 25 and the tank bottom 11.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A gas fired deep fat fryer comprising a tank for holding a cooking medium; a single, U-shaped heating loop located in said tank; a tube stub extending from one end of said heating loop; gas orifice means disposed in said tube stub, said gas orifice means connected to a source of fuel; lid means provided on said tank for removably closing said tank and covering the cooking medium; hinge means connected to said tank and said lid means for hingedly connecting said lid means to said tank; a handle provided on said lid means for engaging said tank and supporting said lid means in substantially horizontal configuration when said lid means is pivoted substantially 180 degrees on said hinge means to expose the cooking medium in said tank; and a stack extending from the opposite end of said heating loop, whereby heat is applied to said U-shaped heating loop for heating the cooking medium in said tank responsive to burning of the fuel in said tube stub at said gas orifice means.

2. The gas fired deep fat fryer of claim 1 wherein said gas orifice means comprises an orifice nipple disposed in said tube stub and an orifice fitting provided in said orifice nipple for feeding the fuel into said tube stub and said one end of said heating loop.

3. The gas fired deep fat fryer of claim 1 comprising at least one stub opening provided in said tube stub for introducing air into said tube stub and supporting combustion of the fuel at said gas orifice means.

4. The gas fired deep fat fryer of claim 3 wherein said gas orifice means comprises an orifice nipple removably disposed in said tube stub and an orifice fitting provided in said orifice nipple for feeding the fuel into said tube stub and said one end of said heating loop and mixing the fuel with the air to support said combustion of the fuel.

5. The gas fired deep fat fryer of claim 1 wherein said gas orifice means comprises an orifice nipple disposed in said tube stub and an orifice fitting provided in said orifice nipple for feeding the fuel into said tube stub and said one end of said heating loop and comprising at least one stub opening provided in said tube stub for introducing air into said tube stub and supporting combustion of the fuel at said orifice fitting.

6. The gas fired deep fat fryer of claim 1 comprising leg means carried by said tank for positioning said tank at a selected elevation.

7. The gas fired deep fat fryer of claim 6 wherein said gas orifice means comprises an orifice nipple disposed in said tube stub and an orifice fitting provided in said orifice nipple for feeding the fuel into said tube stub and said one end of said heating loop.

8. The gas fired deep fat fryer of claim 7 comprising at least one stub opening provided in said tube stub for introducing air into said tube stub and supporting combustion of the fuel at said orifice fitting.

9. The gas fired deep fat fryer of claim 1 comprising drain means communicating with said tank for draining the cooking medium from said tank.

10. The gas fired deep fat fryer of claim 9 wherein said drain means comprises a drain line extending into said tank and valve means provided in said drain line for selectively opening said drain line and draining the cooking medium from said tank.

11. The gas fired deep fat fryer of claim 10 wherein said gas orifice means comprises an orifice nipple slidably and adjustably disposed in said tube stub and an orifice fitting provided in said orifice nipple for feeding the fuel into said tube stub and said one end of said heating loop.

12. A gas fired deep fat fryer comprising a tank for containing a cooking medium; leg means carried by said tank for positioning said tank at a selected elevation; a single heating tube having a vented tube stub extending into said tank to define a U-shaped heating loop located in said tank and a vented stack extending from said heating loop from said tank; an orifice nipple adjustably and removably disposed in said tube stub, said orifice nipple connected to a source of gaseous fuel; a drain line extending from said tank and a valve provided in said drain line for draining the cooking medium from said tank; and lid means hingedly provided on said tank for selectively closing said tank and covering the cooking medium, whereby heat is applied to said U-shaped heating loop for heating the cooking medium responsive to burning of the fuel in said tube stub at said orifice nipple.

13. A gas fired deep fat fryer comprising a tank for containing a cooking medium; legs carried by said tank for positioning said tank at a selected elevation; a single heating tube having a tube stub extending into said tank to define a U-shaped heating loop located in said tank and a vented stack extending substantially vertically from said heating loop from said tank; an orifice nipple removably and slidably disposed in said tube stub, said orifice nipple connected to a source of gaseous fuel; lock means carried by said tube stub for selectively engaging said orifice nipple and locking said orifice nipple in a selected adjusted position in said tube stub; a drain line extending from said tank and a valve provided in said drain line for draining the cooking medium from said tank; a lid hingedly provided on said tank for selectively closing said tank and covering the cooking medium; a hinge connected to said tank and said lid for hingedly connecting said lid to said tank; and a handle provided on said lid for engaging said tank and supporting said lid in substantially horizontal configuration when said lid is pivoted substantially 180 degrees on said hinge to expose the cooking medium in said tank, whereby heat is applied to said U-shaped heating loop for heating the cooking medium responsive to burning of the fuel in said tube stub at said orifice nipple.

* * * * *